United States Patent [19]
Trepl, II et al.

[11] Patent Number: 5,424,582
[45] Date of Patent: Jun. 13, 1995

[54] CUSHIONED DUAL-ACTION CONSTANT SPEED WAVE POWER GENERATOR

[75] Inventors: John A. Trepl, II; Farhad Bashardoust, both of Placentia, Calif.

[73] Assignee: Elektra Power Industries, Inc., Fallbrook, Calif.

[21] Appl. No.: 902,701

[22] Filed: Jun. 23, 1993

Related U.S. Application Data

[63] Continuation-in-part of Ser. No. 590,121, Sep. 28, 1990, abandoned, which is a continuation-in-part of Ser. No. 453,049, Dec. 13, 1989, abandoned, which is a continuation-in-part of Ser. No. 885,864, Jul. 15, 1986, abandoned, which is a continuation-in-part of Ser. No. 614,459, May 24, 1984, abandoned.

[51] Int. Cl.⁶ .................. F03B 13/12; F03B 13/14
[52] U.S. Cl. ........................ 290/53; 60/503; 60/506; 60/507; 290/42
[58] Field of Search ................ 60/503, 506, 507; 290/42, 53

[56] References Cited

U.S. PATENT DOCUMENTS

| 366,768 | 7/1887 | Elias | 60/503 |
|---|---|---|---|
| 3,668,412 | 6/1972 | Vrana et al. | 290/53 |
| 4,175,885 | 3/1979 | Solell | 290/53 |
| 4,379,235 | 4/1983 | Trepl, II | 290/53 |
| 4,469,955 | 9/1984 | Trepl, II | 290/53 |
| 4,599,858 | 7/1986 | La Stolla et al. | 290/53 |
| 4,718,231 | 1/1988 | Vides | 60/507 |

FOREIGN PATENT DOCUMENTS 2339071 9/1977 France ........................ 290/53

OTHER PUBLICATIONS

Salter, S. H., WavePower, Nature Magazine, Jun. 21, 1974, pp. 721–724.

Primary Examiner—A. D. Pellinen
Assistant Examiner—Robert Lloyd Hoover
Attorney, Agent, or Firm—Harry G. Weissenberger

[57] ABSTRACT

A wave power generator is substantially continuously driven by a pair of floats connected to a common drive shaft and positioned side by side along a line perpendicular to the direction of wave motion, one float being specifically designed to efficiently drive the shaft during the rising portion of a wave, the other to efficiently drive the shaft during the falling portion of a wave. The generator's flywheel is maintained at a constant speed by an automatic load control throughout a range of wave patterns sufficient to encompass over 70% of the statistically expected wave patterns at the generator location. An inclined-bottom float is used for the rising wave drive, and a bottom-weighted float is disclosed for the falling wave drive. The floats may be disposed one above the other and may have mating conical surfaces for cushioning occasional contact between the floats. In accordance with another feature of the invention, the efficiency of the inventive apparatus is increased by holding the descending float against movement until it is substantially out of the water, and then releasing it for a substantially free fall.

12 Claims, 8 Drawing Sheets

CUSHIONED DUAL-ACTION CONSTANT SPEED WAVE POWER GENERATOR

STATEMENT OF RELATED CASES

This case is a continuation-in-part of application Ser. No. 590,121 filed 28 Sep. 1990, now abandoned, which is itself a continuation-in-part of application Ser. No. 453,049 filed 13 Dec. 1989, now abandoned, which is itself a continuation-in-part of application Ser. No. 885,864 filed 15 Jul. 1986, entitled "Dual-Action Constant Speed Wave Power Generator", now abandoned, which in turn is a continuation-in-part of application Ser. No. 614,459, filed 24 May 1984 and entitled "Wave Power Generator With Weighted Float", now abandoned.

FIELD OF THE INVENTION

This invention relates to wave power generators, and more particularly to a double-action, constant-speed system which utilizes a maximum of the wave energy for power generation.

BACKGROUND OF THE INVENTION

Application Ser. No. 590,121 and U.S. Pat. Nos. 4,379,235 and 4,469,955 disclose two types of float systems specifically adapted to efficiently generate power during the fall of a wave and the rise of a wave, respectively. The drawback of both systems is that in each case, one half of the wave period is not used to drive the flywheel. As a result, not only does half the wave energy remain unutilized, but the flywheel has to be quite sizable to avoid excessive speed variations within long wave periods. Also, neither system is equally efficient with all types of waves, the system of application Ser. No. 590,121 being more efficient with shorter period waves, and the system of U.S. Pat. No. 4,379,235 being more efficient with longer period waves.

The prior art has proposed using generator drive mechanisms which utilize both directions of movement of a float to generate power. This is not a good solution, however, because the drag produced by the power-generating load slows the travel of the float and prevents it from making a full stroke in either direction.

Another problem of the prior art was the inability of wave power generating systems to adequately accommodate the wide variety of wave heights and periods which occur in practice on both a daily and a seasonal basis.

SUMMARY OF THE INVENTION

In one aspect of the invention, a float for falling-wave power is provided which has a lower, normally immersed portion filled with a relatively heavy substance such as water, or lead, and a normally floating portion filled, for example, with air. The combination of these two portions results in a float which is very stable yet responds very quickly to a rising wave front and remains essentially on top of the wave during its rapid rise. Then, when the wave recedes, the weight of the float does the work as the drag caused by the power generating load causes the float to rise at least partially out of the water.

In another aspect, the present invention makes full use of both the rising and falling movement of the wave by providing separate rising-wave and falling-wave drives for the generator flywheel. Each drive is idle during its return motion and is therefore capable of returning to the full extent of its stroke. In accordance with one embodiment of the invention, the system is adapted to be positioned so that the two floats are disposed along a line perpendicular to the wave front for maximum regularity of drive power.

In accordance with a further aspect of the invention, the flywheel transmission is so arranged that the wave heights and period necessary to produce rated flywheel rpm at full load (long-period, high waves) and rated flywheel rpm at minimum load (short-period, shallow waves) lie within a range encompassing the vast majority of the wave conditions statistically expected to be encountered at the location of the apparatus. Within this range, the invention provides automatic power output adjusting means to maintain the flywheel rpm essentially constant with varying wave patterns.

It is therefore the object of the invention to provide a highly efficient wave power generating system capable of effectively utilizing a wide range of wave patterns to produce alternating-current power at an essentially constant frequency.

In still another aspect of the invention, the efficiency of the float drive is enhanced by providing a mechanism which latches the descending float against descending movement when it reaches the crest of the wave, and then releases it when its weight reaches a predetermined amount as the wave recedes from beneath it. This arrangement makes it possible to utilize a greater portion of the static energy gathered by the float, because the float is not coupled to the flywheel drive below a certain minimum speed of descent, and the static energy released by any float movement below that speed is lost for power generation purposes.

DESCRIPTION OF THE PREFERRED EMBODIMENTS

Figure 1:
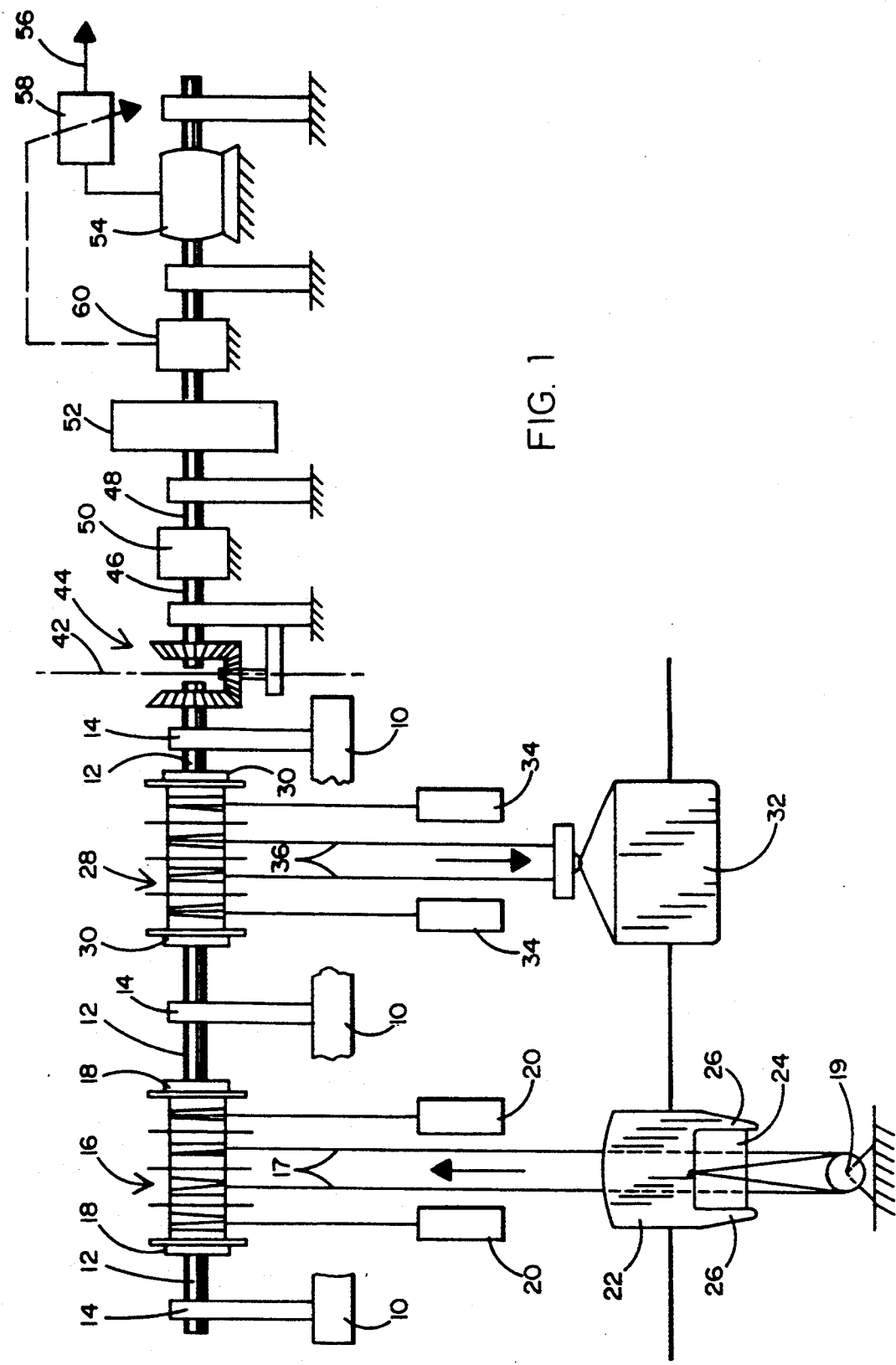
FIG. 1 is a schematic front elevation of a wave power system constructed in accordance with the invention.

FIG. 1 shows a wave power generating system according to this invention in somewhat schematic form. A platform 10 supports a drive shaft 12 in bearings 14. A drum 16 coaxial with the shaft 12 is connected to the shaft 12 by overrunning clutches 18 in such a way that the drum 16 drives the shaft whenever the drum 16 rotates under the influence of the pull of cable 17 which is looped over a sheave 19 attached to the ocean floor.

The rising of float 22 pulls the cable 17. During the descent of float 22 on a falling wave, counterweights 20 keep the cable 17 taut.

The float 22 is preferably of the type described in my U.S. Pat. Nos. 4,379,235 and 4,469,955, i.e. a body with a rearwardly inclined bottom surface 24 and guide flanges 26 which assist in maintaining the float 22 in a position facing the oncoming waves. The purpose of the inclined bottom surface 24 is to use the forward motion of the wave to increase the lift applied to the float 22.

A second drum 28 is coaxially mounted on drive shaft 12 and connected to it by overrunning clutches 30 in such a way as to drive the shaft 12 (in the same direction as drum 16) whenever the drum 28 is rotated by the descent of float 32. Counterweights 34 are provided on drum 28 to keep the cables 36 taut as float 32 rises.

It will be seen that the shaft 12 in this invention is driven essentially continuously: by float 22 during a rising wave, and by float 32 during a falling wave. The use of two floats with unidirectional drives rather than one float with a bidirectional drive has several advantages. For one, a float which must do work in both directions of movement never gets a chance to use the full height of the wave (for example, on a falling wave, the float, because of the drag of the drive shaft, will already encounter a new rise in the wave before it can reach the bottom of the wave trough); and for another, the use of separate rising and falling floats allows the use of the most efficient float construction for each of the rising and falling motions.

Figure 2:
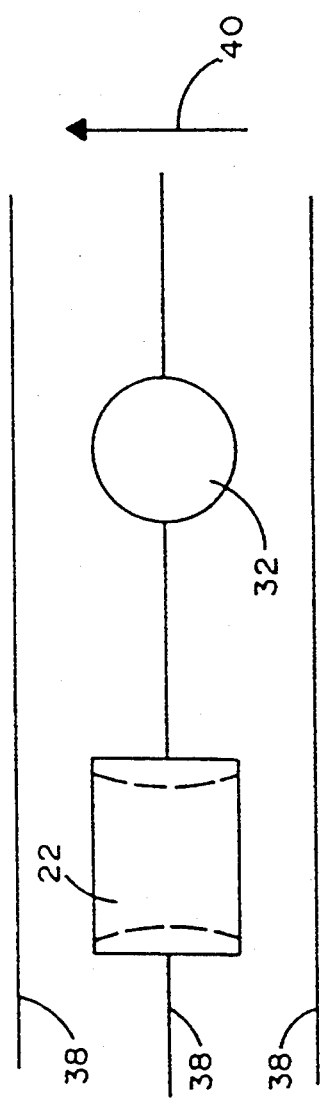
FIG. 2 is a plan view of the float arrangement of the system of FIG. 1.

In order for floats 22 and 32 to drive the shaft 12 without overlap, it is necessary to dispose the two floats side by side along a line parallel to the wave fronts 38 (FIG. 2), i.e. perpendicular to the direction 40 of wave motion. For this purpose, it may be advantageous to journal the platform 10 for pivotal movement about an axis 42 (FIG. 1), or to pivot the entire system, so that varying directions of forward wave motion may be accommodated.

A bevel gear set 44 may be used to transmit rotation from the drive shaft 12 to a transmission shaft 46 which drives the flywheel shaft 48 through an appropriate transmission 50. A flywheel 52 fixedly mounted on shaft 48 is dimensioned to store sufficient energy to maintain the rotational speed of flywheel shaft 48 within a narrow tolerance of its rated speed as long as sufficient wave power is present.

Electrical power is produced in the system of this invention by an alternator 54 driven from flywheel shaft 48. In order to be compatible with a commercial power grid, the alternator 54 must run at a speed sufficiently constant to produce an output 56 at a frequency equal to the power grid frequency ±1 Hz.

Because wave power varies considerably from day to day and season to season, as hereinafter discussed in more detail, it is necessary to provide appropriate means for maintaining the speed of flywheel 52 constant regardless of the drive power produced by floats 22 and 32. This can be accomplished by slip clutches or other mechanical means, but those expedients are necessarily wasteful because the more energy is produced by the floats, the more is dissipated.

In accordance with the invention, a power output controller 58 is provided to regulate the amount of current (and hence power) which can be drawn by the commercial power grid from the alternator 54. The load controller 58 is itself controlled by a speed sensor 60 in an appropriate manner.

Figure 3:
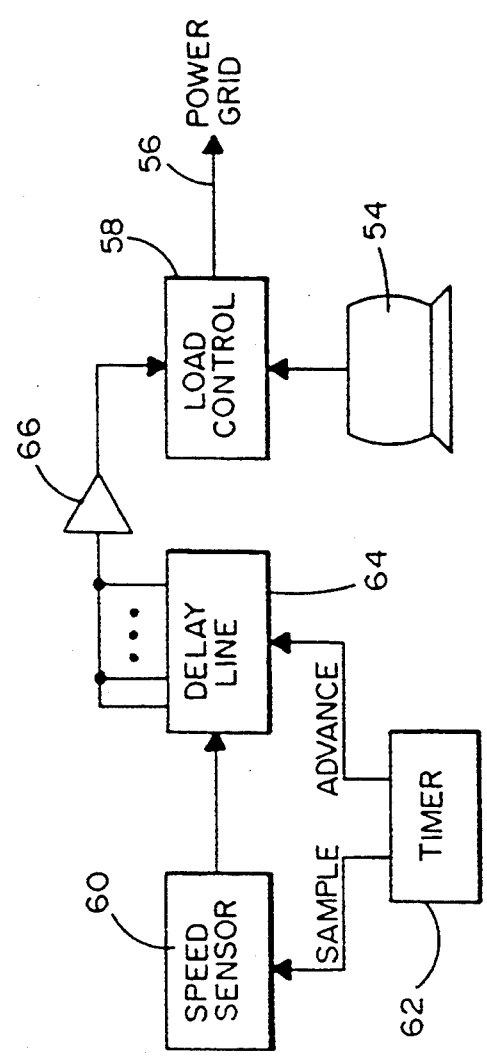
FIG. 3 is a block diagram of the flywheel speed control used in the invention.

FIG. 3 shows one type of arrangement which may be used for load control. A timer 62 samples the output of speed sensor 60 at regular intervals (e.g. every 9 seconds) and loads the sample into a delay line 64 which is advanced one step by timer 62 at the same intervals. An accumulator 66 continuously provides an averaged value of a plurality of samples as the input signal to the load controller 58. The load controller 58 may limit the output current of alternator 54 continuously or in a stepped manner by any appropriate means well known to power engineers.

In accordance with the invention, the transmission 50 is so geared as to drive the flywheel 52 at at least the minimum acceptable speed with no electrical load under wave height and period conditions lying below the line 53 in Table I below. Wave conditions above the line 53 are too weak to produce usable power. The maximum power output of the alternator 54 is so chosen that the flywheel 52 will not exceed its maximum acceptable speed under the maximum reasonably expected wave height and period conditions.

Table I shows the statistical distribution of wave patterns by wave heights and periods at a typical offshore test location during a typical year.

TABLE I

| | Distribution of Occurrence Wave Period in Seconds | | | | | | |
|---|---|---|---|---|---|---|---|
| Wave Height In Feet | 4–6 | 6–8 | 8–10 | 10–12 | 12–14 | 14–16 | 16+ |
| 0–1.64 | .06% | .64% | .21% | .26% | 1.43% | .41% | .06% |
| 1.64–3.28 | 10.59% | 1.72% | .50% | 1.43% | 6.32% | 1.78% | .24% |
| 3.28–4.92 | 17.82% | 3.24% | .60% | .68% | 3.12% | 3.62% | .81% |
| 4.92–6.56 | 8.37% | 9.89% | .58% | .20% | .56% | .96% | .84% |
| 6.56–8.20 | .10% | 11.39% | .32% | .04% | .10% | .26% | .44% |
| 8.20–9.84 | ∅ | 5.74% | .07% | .07% | .03% | ∅ | .09% |
| 9.84–13.12 | ∅ | 1.44% | 2.27% | .01% | .04% | ∅ | .03% |
| 13.12–16.40 | ∅ | ∅ | .51% | .01% | ∅ | ∅ | ∅ |
| 16.40–19.68 | ∅ | ∅ | ∅ | .06% | ∅ | ∅ | ∅ |
| 19.68–22.96 | ∅ | ∅ | ∅ | ∅ | ∅ | ∅ | ∅ |
| 22.96–+ | ∅ | ∅ | ∅ | ∅ | ∅ | ∅ | ∅ |

In a preferred embodiment, the system of this invention is designed to produce power in the wave conditions encompassed by the line 55 in Table I. It will be noted that approximately 70% of the wave patterns which can be statistically expected to occur in the course of a year can be used for power production, the remaining 30% being too weak to maintain the flywheel 52 within the rated speed range even with no electrical load. The small percentage of wave patterns in which the power output required to maintain the flywheel 52 is greater than the maximum power output of the alternator 54 is still usable for the production of power, but the excess power would then have to be dissipated by mechanical means. In the alternative, the system may be disconnected in the rare excessively high wave patterns.

The range of wave patterns capable of maintaining at least minimal rated flywheel speed with no load can be expanded by increasing the size of the floats or varying the transmission ratio; on the other hand, this causes overspeed conditions to occur earlier. The invention teaches that maximum efficiency with minimum equipment complexity can be obtained by proportioning the equipment to make use of the largest percentage of statistically expected wave patterns at the system location.

Figure 4:
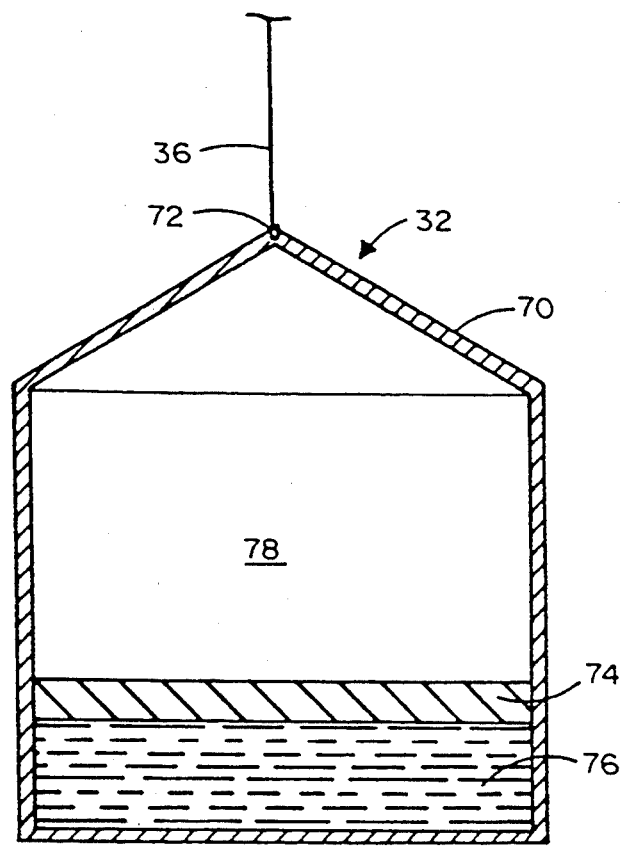
FIG. 4 is a vertical section of the preferred falling-wave float of FIG. 1.

FIG. 4 shows the cross section of a preferred embodiment of the falling-wave float 32. The float 32 preferably includes a thick, corrosion-resistant water-tight casing 70 to which the cables 36 are attached by an appropriate securing device 72. The majority of the weight of the float is concentrated in its lower, normally submerged portion, and may consist, for example, of a layer of lead 74 and a volume 76 of liquid (preferably distilled water or oil to prevent internal corrosion). The weights 74 and 76 are so positioned within the body of the float 32 as to place its center of gravity below the water line in a position to provide maximum stability to the float 32. An air space 78 is provided within the float 32 above the weight layers 74, 76.

Figure 5A:
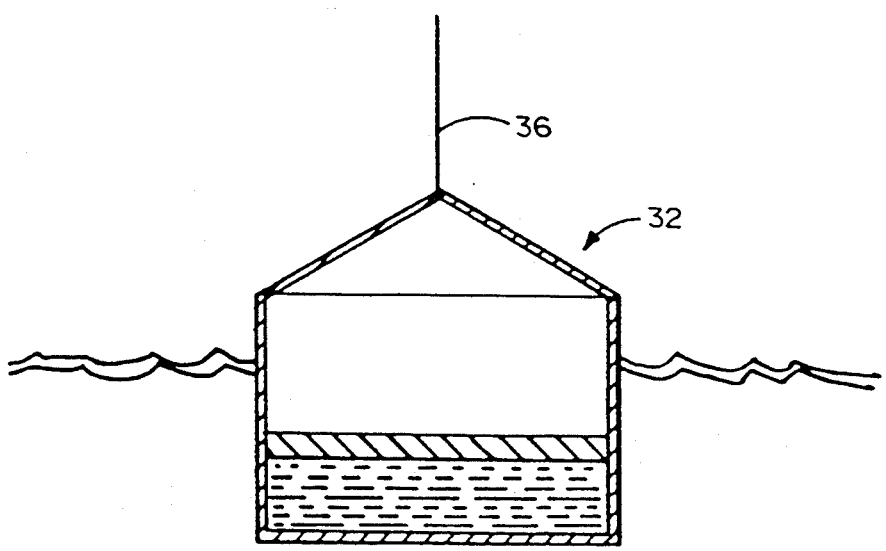
FIGS. 5a, b and c are vertical sections illustrating the operation of the float of FIG. 4.
Figure 5B:
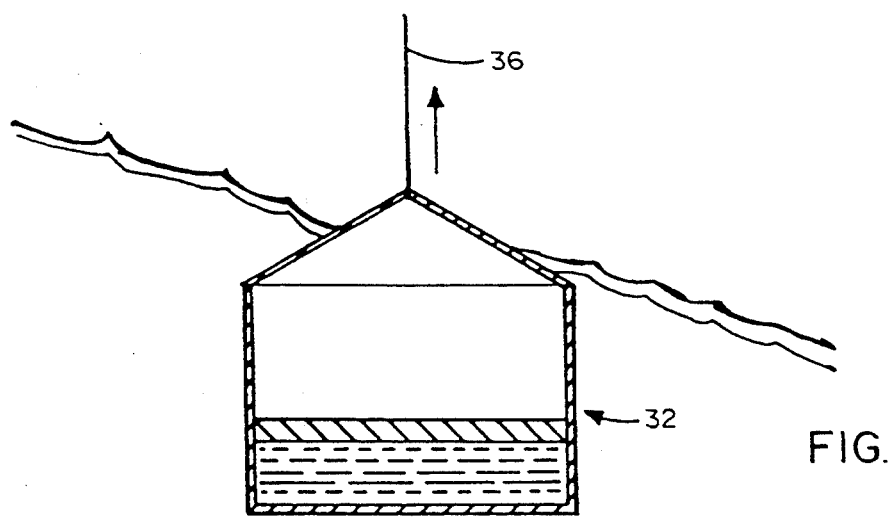
Figure 5C:
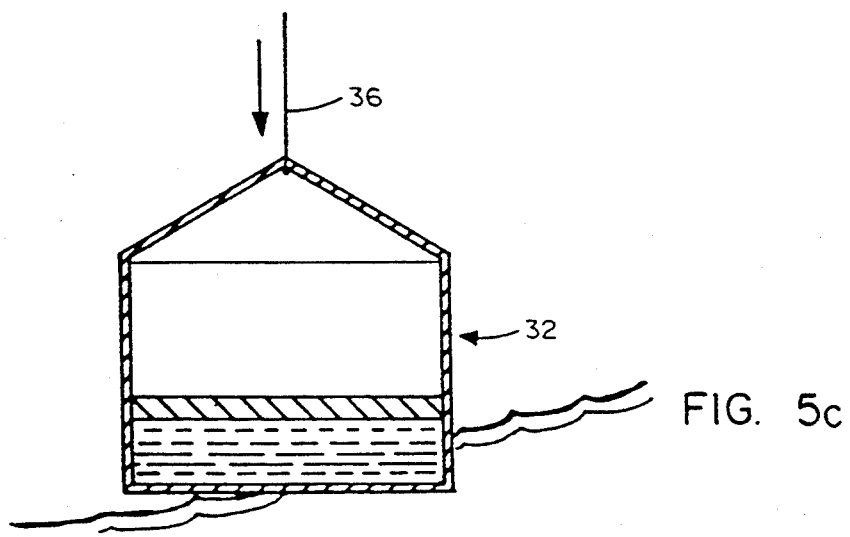

FIGS. 5a through c illustrate the operation of the float 32 of this invention. In FIG. 5a, the float is shown in quiescent water. Because the weight of the float 32 is concentrated below the water line, it not only rides in a stable manner but its gross weight is also reduced by the volume of water it displaces.

In a rising wave front as shown in FIG. 5b, the float 32 rises with the wave, the submersion of the float 32 increasing only enough to provide the extra buoyancy necessary to accelerate the mass of the float 32 in an upward direction. Due to the action of overrunning clutches 30 (FIG. 1), the float 32 is operatively disconnected from the drive shaft 12 during its upward motion and therefore encounters no resistance therefrom. The wave is therefore able to freely lift the float 32 to its crest.

When the wave now recedes as shown in FIG. 5c, the float 32 begins to drop. As it does so, overrunning clutches 30 engage the drive shaft 12. It will be understood that the drive shaft 12 is loaded by the alternator 54 to rotate very slowly, i.e. at a speed slightly less than that dictated by the downward movement of the float 32 in synchronization with the receding wave of FIG. 5c. Consequently, the float 32 begins to rise out of the water as the wave recedes. As it does so, the weight portions of the float 32 are no longer supported by the wave, and the total weight of the float 32 pulls against the inertia of the drive shaft 12 and tries to accelerate it. By properly balancing the parameters of the apparatus, the float can be so adjusted so as to utilize essentially the whole height of the wave, particularly if the wave has a sharp crest followed by a long trough.

Figure 6:
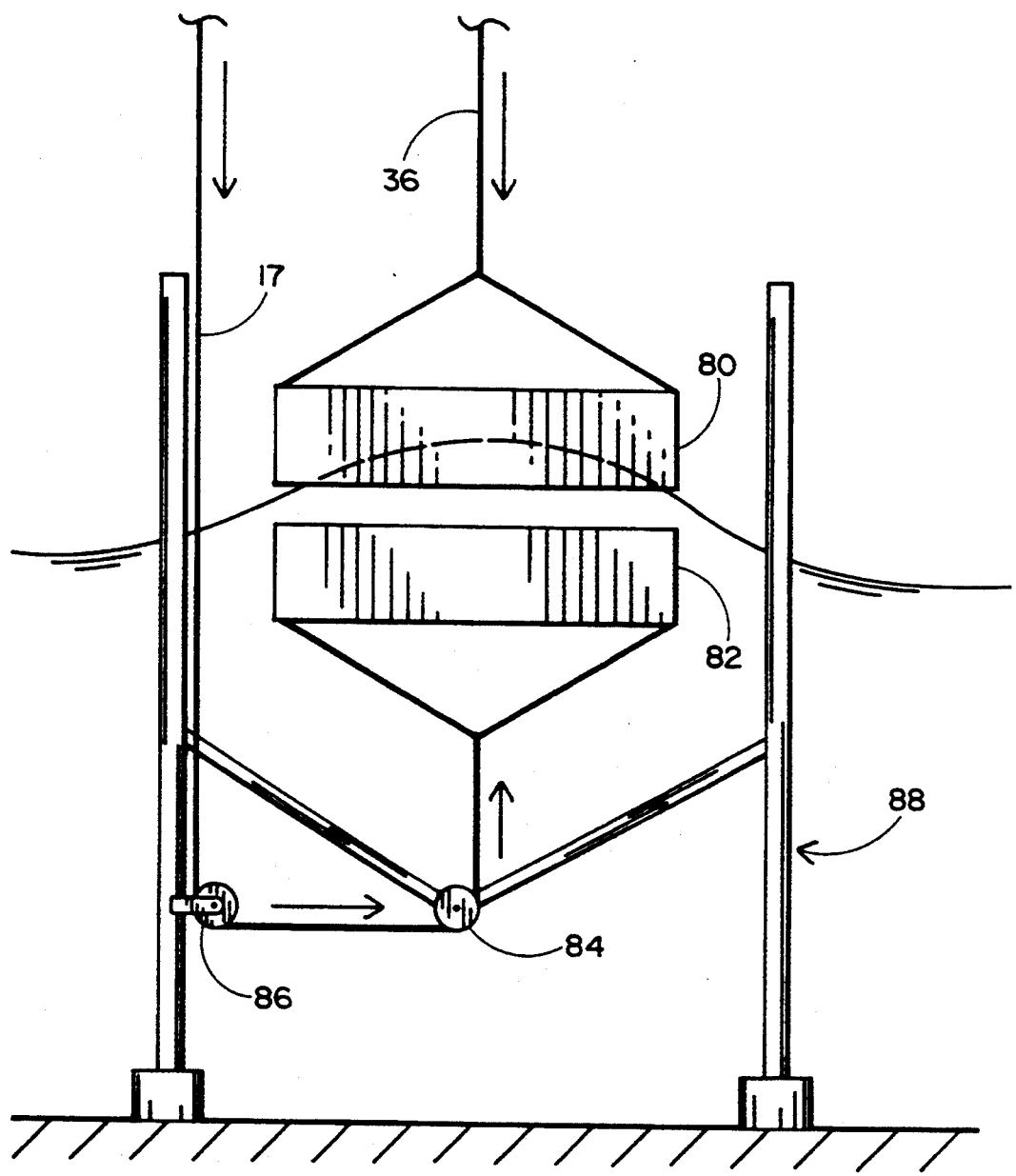
FIG. 6 is a fragmentary, partially schematic elevational view of another embodiment of the invention.

FIG. 6 illustrates an alternative float arrangement which also provides the independent action of two opposing-direction floats detailed above in connection with FIG. 1, wherein the two floats are substantially coaxially with each other. In the arrangement of FIG. 6, a gravity drive float 80 is disposed directly above a buoyancy float 82. The counterweighted drive cable 17 connects the buoyancy float 82 to the drum 16 of FIG. 1 after passing over cable guides 84, 86 mounted on a support structure 88 anchored on the ocean floor. Similarly, the counterweighted cable 36 connects the gravity drive float 80 to drive 28 as on FIG. 1.

The operation of the floats in the embodiment of FIG. 6 is as follows: During the rising part of the wave, the gravity drive float 80 moves rapidly upward because it is not doing any work during its upward motion. At the same time, the buoyancy float 82 rises slowly because of the load imposed upon it by the flywheel 52 (FIG. 1). During this period, the vertical separation between the floats 80, 82 increases.

As the wave crests and begins to fall, the gravity drive float 80 goes into the working mode and descends slowly. As the buoyancy float 82 is still submerged, it continues to rise, and for a short time, the floats 80, 82 move toward each other. However, because the gravity drive float 80 is unable to follow the rapid fall of the wave, it comes out of the water. When the wave level reaches and passes the level of the buoyancy float so that it surfaces, the buoyancy float 82 ceases doing work and descends rapidly with the wave, again increasing the distance between the floats. The reverse situation occurs as the wave once again starts to rise.

Figure 7:
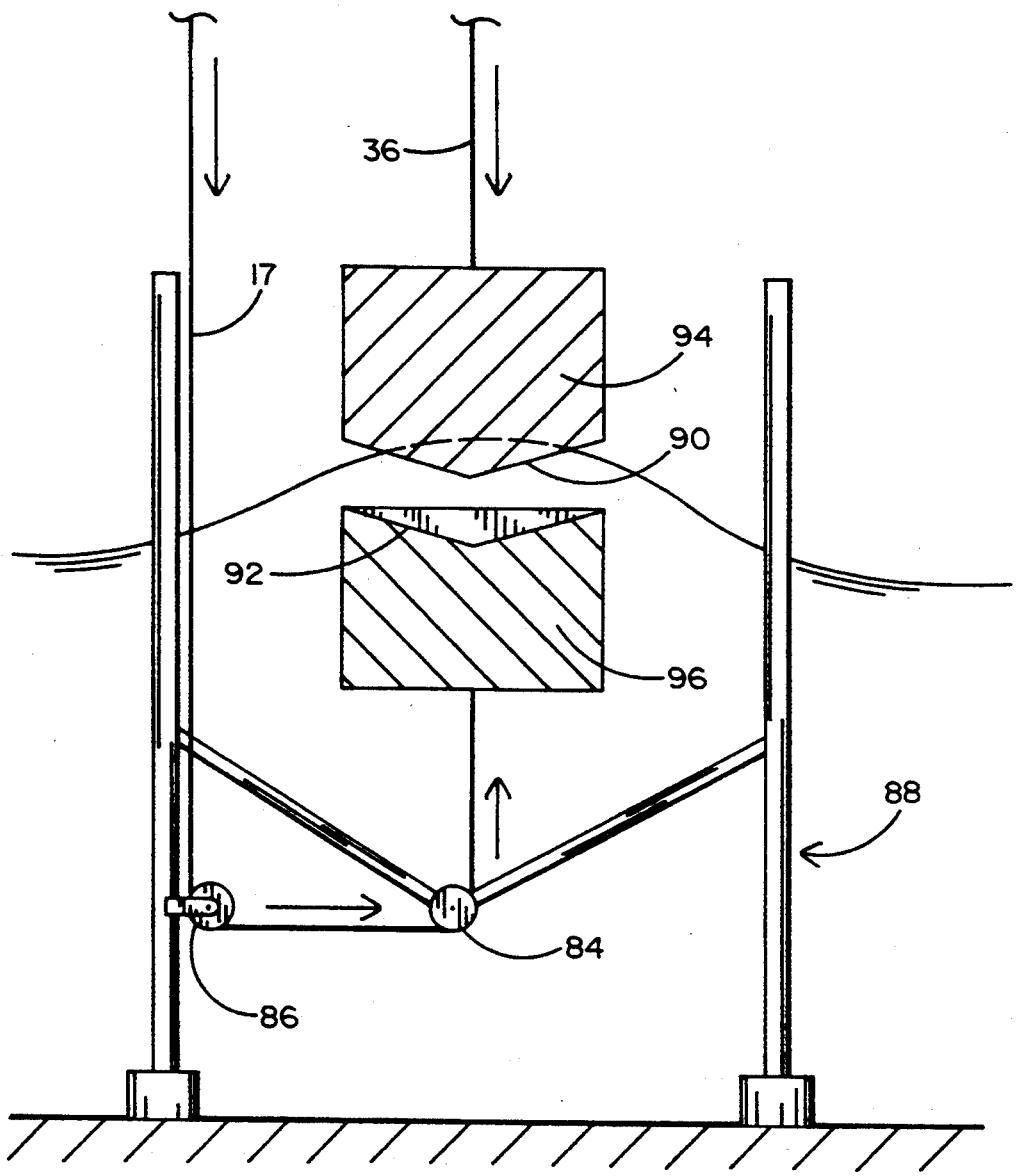
FIG. 7 is a fragmentary elevational view showing a specific float construction particularly adapted for use in the embodiment of FIG. 6.

Because ocean waves are not of uniform height and usually come in sets of a large wave followed by several smaller ones, the floats 80, 82 will occasionally move in such a way as to contact each other. However, as best shown in FIG. 7, the hydraulic action of the water between them can be utilized to cushion such a contact, and the frequency and duration of the contacts is usually small enough not to interfere with the operation of the floats 80, 82.

Where contacts are a problem, the float construction of FIG. 7 is advantageous. The flat mating surfaces of floats 80, 82 as shown in FIG. 6 are susceptible to meet without adequate cushioning if the floats 80, 82 become slightly tilted with respect to each other. By contrast, the concavo-convex shape of the mating surfaces 90, 92 of floats 94, 96 in FIG. 7 tend to move them into alignment due to the hydraulic action of the water as it exits from between the surfaces 90, 92 as the floats 94, 96 approach each other. The surfaces 90, 92 may be conical or pyramidal in shape without departing from the invention.

In practice, the arrangement of FIG. 6 may be advantageous in some situations because it requires a smaller platform than the embodiment of FIG. 1 and is not sensitive to wave direction.

Figure 8A:
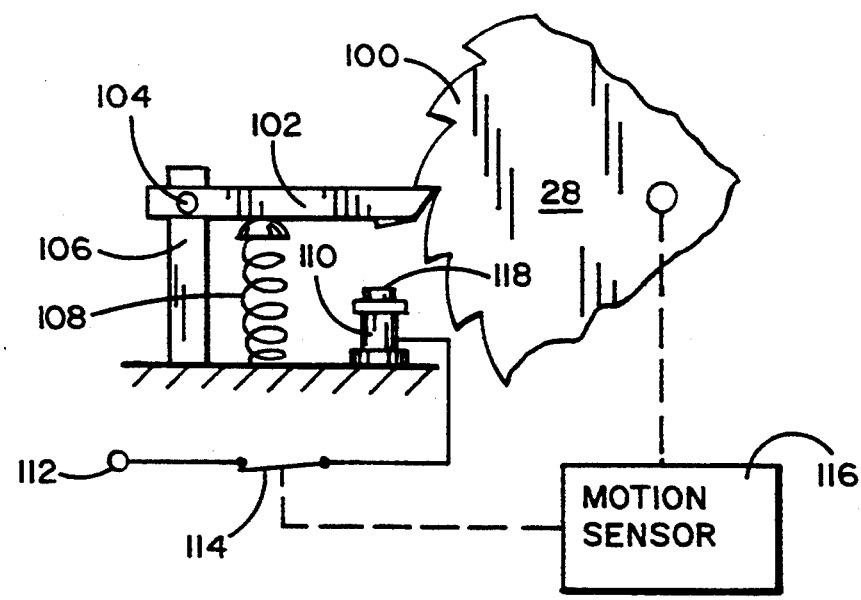
FIGS. 8a through 8c are schematic views illustrating the operation of an efficiency-enhancing addition to the system of FIG. 1.
Figure 8B:
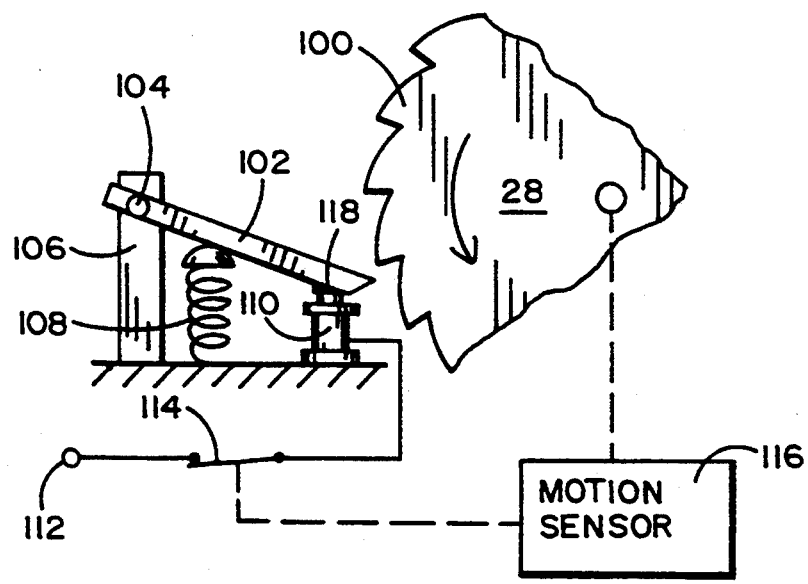
Figure 8C:
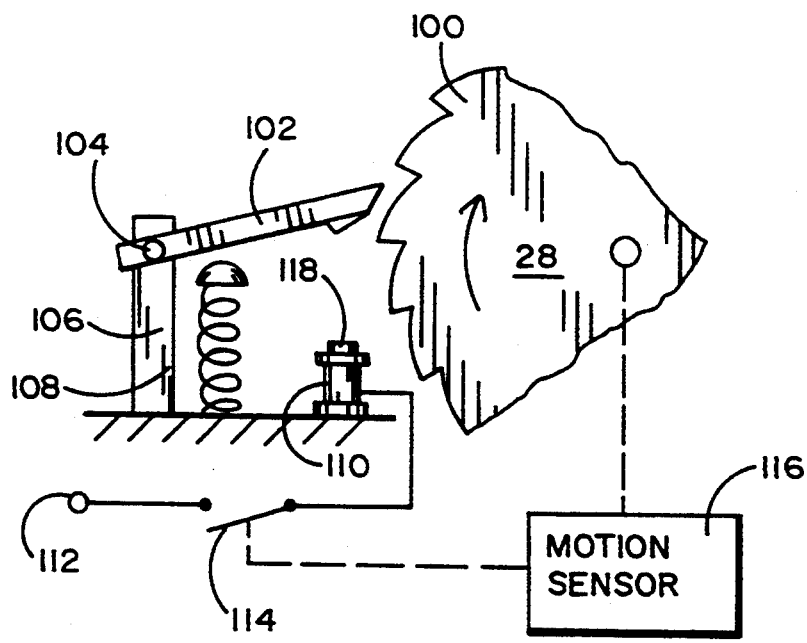
Figure 9:
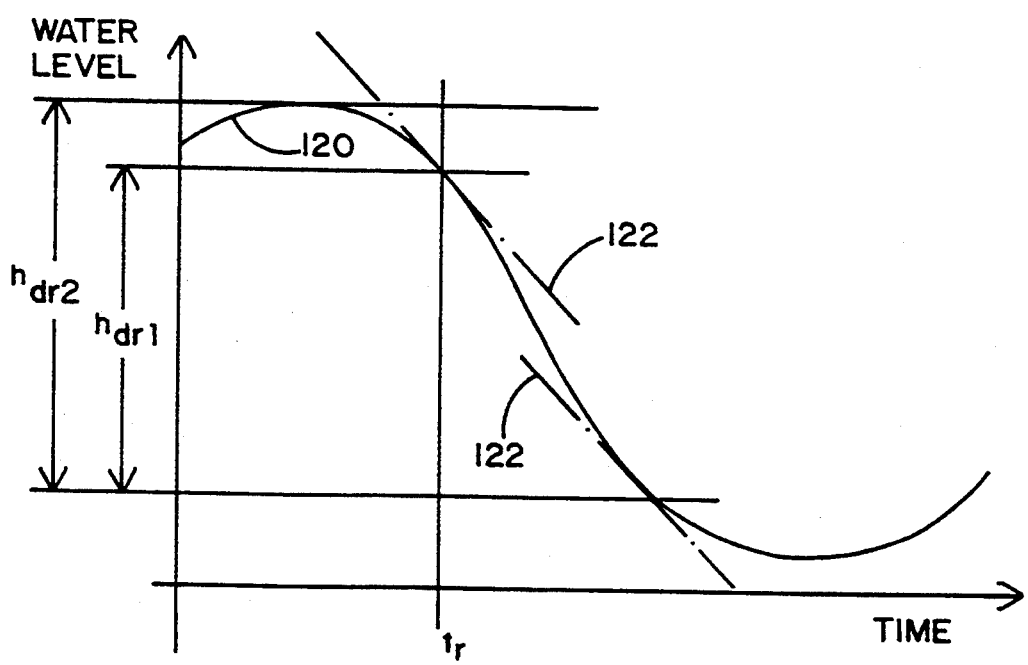
FIG. 9 is a amplitude-time diagram showing the effect of the apparatus of FIGS. 8a–c.

FIGS. 8 and 9 illustrate a way in which the structures of FIGS. 1, 2 and 4 through 7 (or, for that matter, any gravity float) can be enhanced to provide substantially more drive power by increasing their efficiency. In accordance with the invention, this is accomplished by holding the gravity float after the cresting of the wave, in its topmost position until it is almost completely out of the water, and then allowing it to free-fall into its normal floating position.

The mathematical rationale for this is as follows: If the float shaft 12 in FIG. 1 rotates at a speed w, and the wave motion is sinusoidal (which it typically is), then there will be a certain distance $h_F$ through which the gravity float has to drop before the wave is dropping fast enough for the overrunning clutch 30 to engage anbd deliver drive power to the shaft 12.

The motion of the float 32 can be expressed by the equation $$h_w = h_F + h_D + h_{drop}$$

in which $h_w$ is the wave height;

$h_D$ is the draft of the float;

$h_F$ is the distance the float drops slower than the vertical movement of the wave, w; and $h_{drop}$ is the distance the float tries to drop faster than the vertical movement of the wave, w.

Inasmuch as $h_w$ and $h_d$ are constants, h drop (the distance through which the fall of the float 32 does usable work) can be maximized only by minimizing $h_F$.

In accordance with the invention, $h_F$ is minimized by latching the float 32 against downward movement, once it has reached the crest of the wave, until its weight, no longer reduced by buoyancy, becomes sufficient to release the latch.

A suitable mechanism for accomplishing this purpose is schematically shown in FIGS. 8a-c. A ratchet gear 100 is carried by the drum 28 and rotates therewith. A lever 102 pivoted at 104 on a support 106 is biased into a generally horizontal position in FIG. 8a by a spring 108. An electromagnet 110 connected to a power source 112 through a switch 114 operated by a motion sensor 116 is provided for a purpose hereinafter described.

The strength of the spring 108 is such that it holds the lever 102 in a position to normally prevent rotation of the drum 28 in a counterclockwise direction. However, as the wave level drops while the drum 28 prevents the float 32 from falling with it, the weight of the float 32 increases, and the teeth of the drum 28 start pushing the lever 102 downward against the bias of spring 108. Eventually, the lever 102 is pushed far enough toward the electromagnet 110 for its magnetic field to capture the lever 102 and draw it against the armature 118 of electromagnet 110 (FIG. 8b). The drum 28 is thereby released and can turn freely. The float 32, being now essentially suspended in air, accelerates to a free-fall velocity great enough to positively drive the shaft 12. By the time the float 32 resumes its normal floating position, the wave level is falling rapidly enough to maintain the driving relationship of shaft 12 until the float 32 reaches the trough of the wave.

The motion sensor 116, which may be any of a number of devices commercially available for that purpose, detects the direction of motion of the drum 28. As soon as the wave starts rising again, and the motion of the drum 28 becomes clockwise, the motion sensor 116 operates switch 114 to de-energize electromagnet 110 and release lever 102 until the next fall of the wave causes the drum 28 to resume counterclockwise movement. During the clockwise movement of drum 28, the lever 102 simply ratchets on the teeth of drum 28 (FIG. 8c).

FIG. 9 illustrates the operation of the invention. If the float 32 simply follows the sinusoidal movement of the wave 120, and if the shaft 12 speed w is such that the float 32 can do work only when its rate of fall is steeper than the slope 122, of the only usable static energy of the float usable for power production is the weight less its buoyancy of the float 32 times $h_{dr1}$. On the other hand, if the float 32 is held until time $t_r$ when it is essentially out of the water, the usable energy is the weight times the height of $h_{dr2}$ above $h_{dr1}$ plus the weight less its buoyancy times $h_{dr1}$. The percentage of energy utilization improvement achieved by the invention depends upon the shaft speed w and the periodicity of the wave (i.e. the steepness of its sides), but in a typical ocean installation for the generation of commercial power, the improvement would be on the order of 20%.

It will be seen that the present invention provides a highly effective wave power generating system which affords maximum utilization of the statistically expected wave patterns at any given location.

We claim:

1. A wave power generating system, comprising:

a) a platform positioned over a body of water exhibiting wave motion;

b) a drive shaft mounted on said platform;

c) first float means for driving said draft shaft only during the rising portion of a wave;

d) second float means for driving said drive shaft only during the falling portion of a wave;

e) a flywheel operatively connected to said drive shaft to be driven thereby; and f) generating means operatively connected to said flywheel for generating electrical power when driven by said flywheel;

g) said first and second float means being positioned side by side along a line substantially perpendicular to the motion of the waves so as to drive said flywheel with maximum regularity and without overlap in order to achieve a substantially constant operating speed for said generating means;

h) whereby the constancy of speed necessary for commercially usable power generation is achieved with a substantially less massive flywheel.

2. The system of claim 1, in which said first float means include an inclined bottom surface so oriented as to derive lift from the forward motion of said wave, and said second float means has a substantial majority of its weight concentrated in its lower half.

3. The system of claim 1, further comprising:

i) load controller means for controlling the amount of electrical power generated by said generating means;

j) speed sensing means operatively connected to said flywheel for sensing its speed; and k) control means connected to said speed sensing means and said load controller means for varying the power output of said generating means in such a manner as to maintain the speed of said flywheel substantially constant.

4. The system of claim 3, in which said generating means is an alternator, and said flywheel maintains the output of said alternator at a substantially constant frequency.

5. The system of claim 1, in which said second float means include:

a) a body having an upper portion and a lower portion;

b) weight means in said lower portion sufficient to concentrate the bulk of the weight of said float in said lower portion; and c) suspension means attached to said upper portion for floatingly suspending said float in a body of water.

6. The system of claim 5, in which said suspension means are operatively connected to power generating apparatus in such a manner as to allow said float to rise freely during the rising portion of a wave, but to drive said power generating apparatus by virtue of its weight during the falling portion of a wave.

7. A wave power generating system, comprising:

a) a platform positioned over a body of water exhibiting wave motion, said wave motion exhibiting variable wave heights and wave periods forming a plurality of wave patterns, each of said patterns having a statistical probability of occurrence in said body of water;
b) a drive shaft mounted on said platform;
c) first float means for driving said drive shaft only during the rising portion of a wave;
d) second float means for driving said drive shaft only during the falling portion of a wave, said first and second float means being positioned side by side along a line substantially perpendicular to the motion of the waves;
e) a flywheel operatively connected to said drive shaft to be driven thereby;
f) generating means operatively connected to said flywheel for generating electrical power when driven by said flywheel;
g) load controller means for controlling the amount of electrical power generated by said generating means;
h) speed sensing means operatively connected to said flywheel for sensing its speed; and
i) control means connected to said speed sensing means and said load controller means for varying the power output of said generating means in such a manner as to maintain the speed of said flywheel substantially constant;
j) said generating means being an alternator, and said flywheel maintaining the output of said alternator at a substantially constant frequency;
k) said flywheel having a narrow allowable speed range, the speed of said flywheel being a function of wave height, wave period, and alternator load; and
l) the range of wave heights and periods lying between the minimum height and maximum period required to drive said flywheel at the minimum allowable speed with no load, and the maximum heights and minimum period required to drive said flywheel at the maximum allowable speed with maximum load, encompassing in excess of 70% of the statistically expected wave patterns at the location of the system.

8. A wave power generating system, comprising:
a) a platform positioned over a body of water exhibiting wave motion;
b) a drive shaft mounted on said platform;
c) first float means for driving said drive shaft only during the rising portion of a wave;
d) second float means independent of said first float means for driving said drive shaft only during the falling portion of a wave;
e) a flywheel operatively connected to said drive shaft to be driven thereby; and
f) generating means operatively connected to said flywheel for generating electrical power when driven by said flywheel;
g) said first and second float means being positioned in substantially vertical alignment with each other so as to drive said flywheel with maximum regularity in order to achieve a substantially constant operating speed for said generating means;
h) whereby the constancy of speed necessary for commercially usable power generation is achieved with a substantially less massive flywheel.

9. The wave power generating system of claim 8, in which said first and second float means have mating concavo-convex surfaces facing each other, whereby the water entrapped therebetween cushions contacts between said first and second float means.

10. The wave power generating means of claim 9, in which said mating surfaces are conical in shape.

11. The wave power generating means of claim 10, in which the mating surface of the upper float is convex and the mating surface of the lower float is concave.

12. A float arrangement for converting wave motion into work, comprising:
a) a pair of floats disposed substantially coaxially with each other, said floats being disposed for movement toward and away from each other in a fluid in response to wave motion in said fluid, said floats being capable of contacting each other at times during said movement;
b) said floats having mating surfaces facing each other, one of said mating surfaces being concave and the other convex,
c) whereby the fluid between said surfaces tends to cushion said contact while tending to coaxially align said floats with each other as they enter into contact with each other.

* * * * *

UNITED STATES PATENT AND TRADEMARK OFFICE
CERTIFICATE OF CORRECTION

PATENT NO. : 5,424,582
DATED : June 13, 1995
INVENTOR(S) : John A. Trepl, II

It is certified that error appears in the above-indentified patent and that said Letters Patent is hereby corrected as shown below:

On the title page: under Item [19] delete "et al., and in"

Item [75] delete the name of Farhad Bashardoust as co-inventor.

Signed and Sealed this

Twenty-ninth Day of August, 1995

Attest:

BRUCE LEHMAN

*Attesting Officer*        *Commissioner of Patents and Trademarks*